(12) United States Patent
Roy

(10) Patent No.: US 8,142,829 B2
(45) Date of Patent: Mar. 27, 2012

(54) BEVERAGE COMPOSITION AND METHOD OF REDUCING DEGRADATION OF MONATIN

(75) Inventor: Glenn M. Roy, Beacon, NY (US)

(73) Assignee: PepsiCo, Inc., Purchase, NY (US)

( * ) Notice: Subject to any disclaimer, the term of this patent is extended or adjusted under 35 U.S.C. 154(b) by 786 days.

(21) Appl. No.: 12/236,985

(22) Filed: Sep. 24, 2008

(65) Prior Publication Data

US 2010/0075005 A1    Mar. 25, 2010

(51) Int. Cl.
    *A23L 2/00*    (2006.01)
(52) U.S. Cl. .................. 426/330.3; 426/548; 426/590
(58) Field of Classification Search .............. 426/330.3, 426/330.5, 548, 590, 599, 654
    See application file for complete search history.

(56) References Cited

U.S. PATENT DOCUMENTS

| | | |
|---|---|---|
| 6,572,906 B1 | 6/2003 | Higashimura et al. |
| 2004/0091589 A1 | 5/2004 | Roy et al. |
| 2005/0106305 A1 | 5/2005 | Abraham et al. |
| 2006/0051472 A1 | 3/2006 | Koda et al. |
| 2006/0083695 A1 | 4/2006 | Mori |
| 2006/0257550 A1 | 11/2006 | Mori |

FOREIGN PATENT DOCUMENTS

| | | |
|---|---|---|
| EP | 1 752 498 A1 | 2/2007 |
| EP | 1 808 083 A1 | 7/2007 |

OTHER PUBLICATIONS

Careri, M. et al., "Spectrophotometric and coulometric detection in the high-performance liquid chromatography of flavonoids and optimization of sample treatment for the determination of quercetin in orange juice," Journal of Chromatography, 2000, pp. 449-460, Elsevier Science B.V.
Rouseff, R.L. et al., "Quantitation of Polymethoxylated Flavones in Orange Juice by High-Performance Liquid Chromatography," Journal of Chromatography, 1979, pp. 75-87, Elsevier Scientific Publishing Company.
International Search Report for related Application No. PCT/US2009/057491, mailed Nov. 25, 2009, pp. 1-4.
Ikeda, R. et al., "Loss of Sweetness of Monatin with Lactamization," 2007, pp. 1-4, Proceedings of the 4th International Peptide Symposium in conjunction with the 7th Australian Peptide Conference and the 2nd Asia-Pacific International Peptide Symposium, 2007.
"Antioxidant," Food Technology, Jun. 2007, p. 57, retrieved online from http://www.ift.org.
"Sanmelin AO-3000," 2007, pp. 1-3, San-Ei Gen F.F.I., Inc.

*Primary Examiner* — Leslie Wong
(74) *Attorney, Agent, or Firm* — Banner & Witcoff, Ltd.

(57) ABSTRACT

A beverage comprising a first ingredient which comprises a $C_6$-$C_3$ phenylpropenoic carbonyl compound in an effective amount to reduce degradation of a second ingredient in the beverage, the second ingredient being monatin, and to reduce a corresponding change in a characteristic of the beverage. In addition, a method of preventing the degradation of monatin in a monatin-containing composition is provided.

20 Claims, No Drawings

BEVERAGE COMPOSITION AND METHOD OF REDUCING DEGRADATION OF MONATIN

FIELD OF THE INVENTION

This invention relates to beverages including beverage concentrates, etc. In particular, this invention relates to beverages having formulations modified to reduce degradation of monatin.

BACKGROUND

Natural and non-nutritive sweeteners for beverages can degrade during heat and ultraviolet (UV) radiation stress. When some sweeteners degrade, they adversely effect taste and/or produce a non-desirable color hue change to a beverage.

Monatin is a high intensity sweetener that can be used in beverages. Monatin, however, can degrade, particularly when subjected to heat and ultraviolet (UV) stress.

BRIEF SUMMARY OF THE INVENTION

In accordance with a first aspect, a beverage is provided comprising a first ingredient comprising a $C_6$-$C_3$ phenylpropenoic carbonyl structure, and a second ingredient, the second ingredient being monatin, the first ingredient represented by the formula selected from:

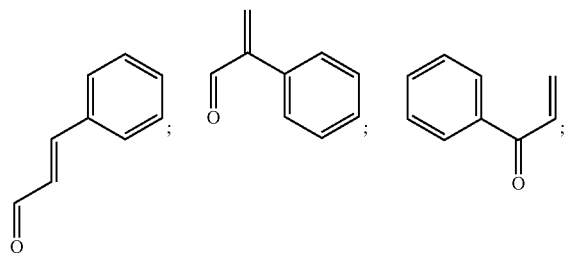

and mixtures thereof.

In accordance with a second aspect, a method for preventing or at least reducing monatin degradation is provided. The method comprises adding a first ingredient represented by any one of the above $C_6$-$C_3$ phenylpropenoic carbonyl formulas or mixtures thereof to a composition comprising monatin.

In accordance with a third aspect, a non-colored beverage is provided comprising a first ingredient represented by any one of the above $C_6$-$C_3$ phenylpropenoic carbonyl formulas or mixtures thereof, the first ingredient in an effective amount to reduce degradation of a second ingredient, the second ingredient being monatin, and a corresponding change in the beverage color or appearance from no color to a color.

It will be appreciated by those skilled in the art, given the benefit of the following description of certain exemplary embodiments of the beverage and other beverage products disclosed here, that at least certain embodiments of the invention have improved or alternative formulations suitable to provide desirable color hue or no color hue characteristics, taste profiles, nutritional characteristics, etc. These and other aspects, features and advantages of the invention or of certain embodiments of the invention will be further understood by those skilled in the art from the following description of exemplary embodiments.

DETAILED DESCRIPTION OF THE INVENTION

Those of ordinary skill in the art will understand that, for convenience, some ingredients are described here in certain cases by reference to the original form of the ingredient in which it is added to the beverage product formulation. Such original form may differ from the form in which the ingredient is found in the finished beverage product. Thus, for example, in certain exemplary embodiments of the beverage products according to this disclosure, different sweeteners would typically be substantially homogenously dissolved and dispersed in the beverage. Likewise, other ingredients identified as a solid, concentrate (e.g., juice concentrate), etc. would typically be homogenously dispersed throughout the beverage or throughout the beverage concentrate, rather than remaining in their original form. Thus, reference to the form of an ingredient of a beverage product formulation should not be taken as a limitation on the form of the ingredient in the beverage product, but rather as a convenient means of describing the ingredient as an isolated component of the product formulation.

It should be understood that beverages and other beverage products in accordance with this disclosure may have any of numerous different specific formulations or constitutions. The formulation of a beverage product in accordance with this disclosure can vary to a certain extent, depending upon such factors as the product's intended market segment, its desired nutritional characteristics, flavor profile and the like. For example, it will generally be an option to add further ingredients to the formulation of a particular beverage embodiment, including any of the beverage formulations described below. Additional (i.e., more and/or other) sweeteners may be added, flavorings, electrolytes, vitamins (e.g. Vitamin A, Vitamin D, Vitamin $B_{12}$, and mixtures thereof, fruit juices or other fruit products, tastants, masking agents and the like, flavor enhancers, and/or carbonation typically can be added to any such formulations to vary the taste, mouthfeel, nutritional characteristics, etc.

In general, a beverage in accordance with this disclosure typically comprises at least water, a first ingredient comprising a $C_6$-$C_3$ phenylpropenoic carbonyl structure, and a second ingredient, the second ingredient being monatin, the first ingredient represented by the formula selected from:

(a)

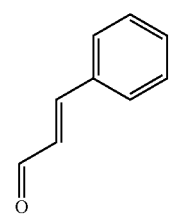

(b)

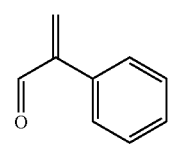

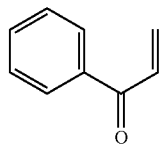

(c)

Any compound possessing such a structure alone or as part of a larger structure is suitable for use as a $C_6$-$C_3$ phenylpropenoic carbonyl compound, i.e., a botanically derived or synthetically manufactured monatin stabilizer, of the present invention, provided that it provides at least some protection or reduction from monatin degradation. The monatin stabilizers may be commercially available, may be synthesized according to procedures known in the art or may be supplied by, derived from or isolated or extracted from known botanicals or extracts thereof. A representative extraction procedure includes the one disclosed by B. Buszewski, et al., J. Pharm. Biomed. Anal., vol. 11, no. 3, p. 211-215 (1993).

In accordance with one aspect of the present invention, $C_6$-$C_3$ phenylpropenoic carbonyl compounds suitable for use in the present invention include, without limitation, rosmarinic acid, chlorogenic acid, cichoric acid, caffeic acid, coumaric acid, cinnamic acid, ferulic acid, sinapic acid, caftaric acid, eichloric acid, echinacoside and combinations thereof. It is clear from the structures set forth below that the generic structure (a) of the above $C_6$-$C_3$ phenylpropenoic carbonyl formulas is present in materials-such as rosmarinic acid, chlorogenic acid, and cichoric acid.

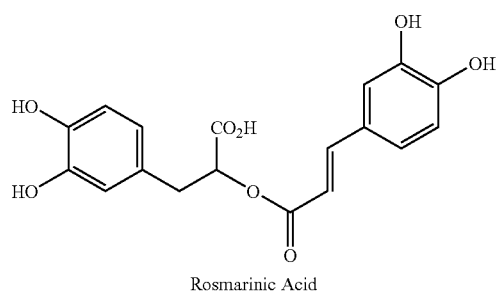

Rosmarinic Acid

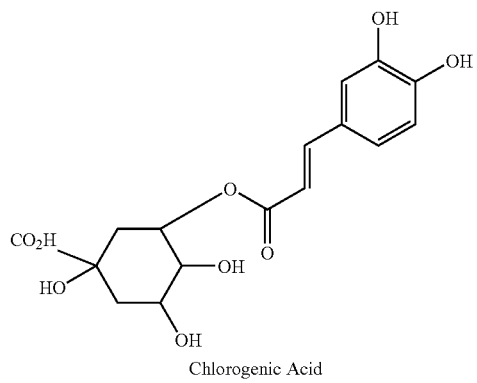

Chlorogenic Acid

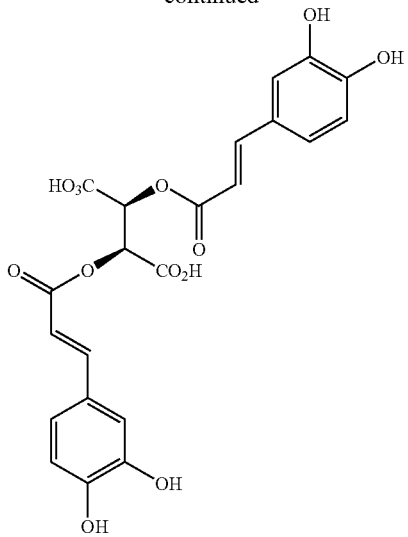

Cichoric Acid

It is also clear from the structures of these substances that substitution of the above generic $C_6$-$C_3$ phenylpropenoic carbonyl structures, so long as both unsaturation near and oxidation at a carbon atom remain, is intended. In fact, substitution is necessary to obtain a wide range of suitable monatin stabilizers. Suitable substituents include, without limitation, hydroxyl, methoxyl, and others as usually found in plant metabolite phenols. Further, it can be readily appreciated that cichoric acid may well be a more effective monatin stabilizer than some of the other listed acids, given the presence of two structures (a) of the above generic $C_6$-$C_3$ phenylpropenoic carbonyl structures therein. Generally, it is found that the addition of hydroxyl groups on the aryl rings enhances monatin stabilization. Hence, monatin stabilization ability of caffeic acid (2 hydroxyl groups)>ferulic acid>coumaric acid>cinnamic acid (no hydroxyl groups) is observed.

In certain preferred embodiments of the present invention, the above-listed $C_6$-$C_3$ phenylpropenoic carbonyl compound of the botanically derived monatin stabilizer is provided via an extract of a botanical. Extracts suitable for use in the present invention include, without limitation, rosemary extract, green coffee bean extract, blueberry extract, rhododendron extract, sunflower kernel extract, chicory leaf extract, purple coneflower extract, lettuce extract and combinations thereof. More generally, extracts of botanicals in any of the labiatae, ericaceae or asteraceae families are suitable for use. As can be seen in Table 1 below, each of the above-noted extracts contains one or more $C_6$-$C_3$ phenylpropenoic carbonyl compounds which serve as a monatin stabilizer.

TABLE 1

| common name | species | $C_6$-$C_3$ phenylpropenoic carbonyl compound(s) |
| --- | --- | --- |
| rosemary | *Rosmarinus officinalis* | rosmarinic acid |
| green coffee bean | *Coffea Arabica* | chlorogenic acid |
| blueberry | *Vaccinium vulgaris* | chlorogenic acid |
| rhododendron | *Rhododendron caucasicum* (Ungem) | chlorogenic acid |
| sunflower kernel | *Helianthus annuus* | chlorogenic acid |
| chicory leaves | *Cichorium intybus* | cichoric acid |
| purple coneflower | *Echinacea angustifolia* | echinacoside, cichoric acid, caftaric, eichloric acid |

TABLE 1-continued

| common name | species | $C_6$-$C_3$ phenylpropenoic carbonyl compound(s) |
| --- | --- | --- |
| purple coneflower | *Echinacea purpurea* (Moench) | cichoric acid, chlorogenic acid, echinacoside |
| lettuce | *Lactuca sativa* | cichoric acid |

One of ordinary skill in the art will readily appreciate that the amount of a $C_6$-$C_3$ phenylpropenoic carbonyl compound present in a given extract will vary. Different species by nature may possess varying amounts of a $C_6$-$C_3$ phenylpropenoic carbonyl compound. The amount may also vary depending on the stage of development of a given botanical. As an illustration, Table 2 below shows the variation in chlorogenic acid and echinacoside content in the 'Magical Ruth' cultivar of *Echinacea purpurea*.

TABLE 2

Variations in the content of echinacoside and chlorogenic acid in flower heads of *Echinacea purpurea* cultivar 'Magical Ruth'*

| | Hydrophilic components (%) | |
| --- | --- | --- |
| Flower stage | Chlorogenic acid | Echinacoside |
| I (early) | 0.060 | 0.012 |
| II (medium) | 0.024 | 0.022 |
| III (mature) | 0.023 | 0.015 |
| IV (overblown) | 0.020 | 0.016 |

*results are obtained from 20 plants replicated three times: W. Letchamo, et al., "Cichoric Acid . . . in *Echinacea purpurea* as Influenced by Flower Developmental Stages", Perspectives on New Crops and New Uses, J. Janick, ed., ASHS Press. Alexandria, VA, pp. 494-498 (1999).

In addition, the cichoric acid content of 'Magical Ruth' varies from 4.67% at stage I to 1.42% at stage IV. Therefore, it would seem that early cultivation would provide the richest extract of desirable monatin stabilizers.

Other $C_6$-$C_3$ phenylpropenoic carbonyl compounds suitable for use in the present invention include, without limitation, cinnamoyl esters, coumarins, chalcones, flavones, chromones, isoflavones, and combinations thereof. Many of these types of compounds can be derived from a group of known natural products called flavonoids, which are found in fruits, vegetables, nuts, seeds and flowers, as well as in teas and wines; flavonoids have demonstrated many biological and pharmacological activities such as anti-bacterial, anti-fungal, anti-viral, anti-oxidant, anti-inflammatory, anti-mutagenic and anti-allergic and inhibitory activities on several enzymes. As can be seen from structures below, each of cinnamoyl esters, coumarins, chalcones, flavones, chromones and isoflavones incorporate a generic $C_6$-$C_3$ structure.

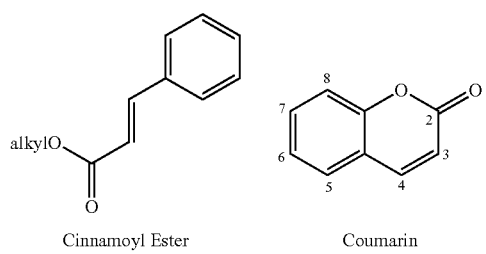

Cinnamoyl Ester     Coumarin

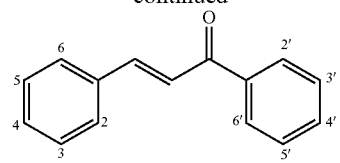

Chalcone

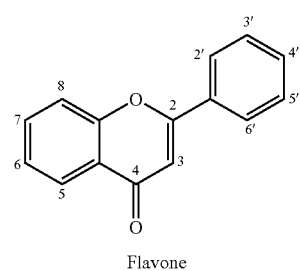

Flavone     Chromone

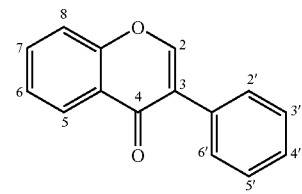

Isoflavone

Cinnamoyl esters (flavors) suitable for use in the present invention include, without limitation, cinnamyl formate, cinnamyl acetate, ethyl cinnamate, cinnamyl propionate, cinnamyl alpha-toluate, cinnamyl 2-amino benzoate, cinnamyl anthranilate, cinnamyl benzoate, cinnamyl beta-phenyl acrylate, cinnamyl butyrate, cinnamyl cinnamate, cinnamyl isobutyrate, cinnamyl isovalerate, cinnamyl methyl ketone, cinnamyl ortho-amino benzoate, cinnamyl phenyl acetate, cinnamyl 3-phenyl propenoate and combinations thereof. It is clear that substitution on the generic cinnamoyl ester structure, so long as both unsaturation near and oxidation at a carbon atom remain, is intended. In fact, substitution is necessary to obtain a wide range of suitable monatin stabilizers. Suitable substituents for the generic cinnamoyl ester structure include, without limitation, any alkyl group including linear, non-linear, cyclic and acyclic alkyls, as well as unsubstituted and substituted alkyls.

Coumarins suitable for use in the present invention include, without limitation, coumarin, coumestrol, dalbergin, daphnetin, esculetin, citropten, noralbergin, umbelliferone, scopoletin, xanthotoxol, psoralen, bergapten, fraxetin and combinations thereof. It is clear that substitution on the generic coumarin structure, so long as both unsaturation near and oxidation at a carbon atom remain, is intended. In fact, substitution is necessary to obtain a wide range of suitable monatin stabilizers. Suitable substituents for the generic coumarin structure include, without limitation, OH, $OCH_3$, $C_6H_4O_2$, Ph and $CH_2$=CHO. Table 3 below sets forth the substituents present for the above-listed coumarin compounds suitable for use in the present invention.

TABLE 3

Exemplary coumarins with substituent positions.

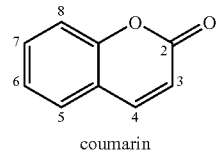

coumarin

| name | 3 | 4 | 5 | 6 | 7 | 8 |
|---|---|---|---|---|---|---|
| coumestrol | $C_6H_4O_2$ | | | | OH | |
| dalbergin | | | | OH | $OCH_3$ | |
| daphnetin | | | | | OH | OH |
| esculetin | | | | | OH | |
| citropten | | | | $OCH_3$ | $OCH_3$ | |
| noralbergin | | Ph | | OH | OH | |
| umbelliferone | | | | | OH | |
| scopoletin | | | | $OCH_3$ | OH | |
| xanthotoxol | | | | $CH_2$=CHO | | OH |
| psoralen | | | | $CH_2$=CHO | | |
| bergapten | | | $OCH_3$ | $CH_2$=CHO | | |
| fraxetin | | | | $OCH_3$ | | OH |

Notes:
Ph = phenyl
blank box = H

Chalcones suitable for use in the present invention include, without limitation, chalcone, polyhydroxychalcones, butein, phloridzin, echinatin, marein, isoliquiritigenin, phloretin and combinations thereof. It is clear that substitution on the generic chalcone structure, so long as both unsaturation near and oxidation at a carbon atom remain, is intended. In fact, substitution is necessary to obtain a wide range of suitable monatin stabilizers. Suitable substituents for the generic chalcone structure include, without limitation, OH, $OCH_3$ and OGlc. Table 4 below sets forth the substituents present for the above-listed chalcone compounds suitable for use in the present invention.

TABLE 4

Exemplary chalcones with substituent positions.

chalcone

| name | 2 | 3 | 4 | 2' | 3' | 4' | 6' |
|---|---|---|---|---|---|---|---|
| butein | | OH | OH | OH | | OH | |
| phloridzin | | | OH | OGlc | | OH | OH |
| echinatin | $OCH_3$ | | | | OH | OH | |
| marein | | OH | OH | OH | OH | OGlc | |
| Isoliquiritigenin | OH | | OH | | | OH | |
| phloretin | | | OH | OH | | OH | OH |

Notes:
Glc = glucose
blank box = H

Flavones suitable for use in the present invention include, without limitation, rhoifolin, diosmin, apiin, apigenin, myricetin, kaempferol, luteolin, morin, neodiosmin, quercetin, rutin, balcalein, cupressuflavone, datiscetin, diosmetin, fisetin, galangin, gossypetin, geraldol, hinokiflavone, scutellarein, flavonol, primuletin, pratol, robinetin, quercetagetin, $(OH)_4$ flavone, tangeritin, sinensetin, fortunelin, kampferide, chrysoeriol, isorhamnetin, vitexin and combinations thereof.

Flavones are primarily bitter, e.g., quercetin, and insoluble. However, at the use levels of the monatin stabilizers, the normally associated bitter tastes are not perceived in the utilized beverage matrices due to the phenomenon of mixture suppression of bitterness by the formulated sweetness and sourness. The maximally preferred use levels of all monatin stabilizers are governed by their solubility in the desired beverage matrices as determined by routine experimentation.

It is clear from the structures set forth below that the generic flavone structure is present in materials such as rhoifolin and rutin.

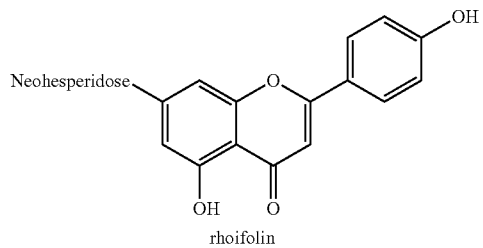

rhoifolin

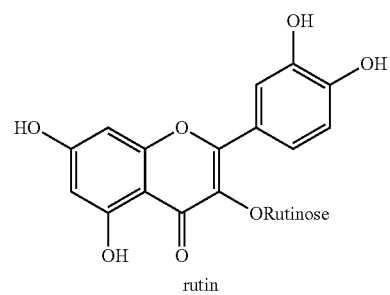

rutin

It is also clear from the structures of these flavones that substitution on the generic flavone structure, so long as both unsaturation near and oxidation at a carbon atom remain, is intended. In fact, substitution is necessary to obtain a wide range of suitable monatin stabilizers. Suitable substituents include, without limitation, OH, ORut, OApioGlc, ONeoHesp, dimer, $OCH_3$ and OGlc. Table 5 below sets forth the substituents present for the above-listed flavone compounds suitable for use in the present invention.

TABLE 5

Exemplary flavone with substituent positions.

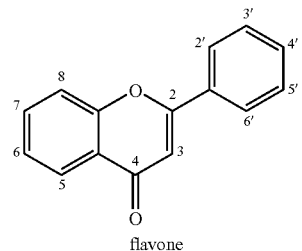

flavone

| Name | substituent position | | | | | | | | |
|---|---|---|---|---|---|---|---|---|---|
| | 3 | 5 | 6 | 7 | 8 | 2' | 3' | 4' | 5' |
| rhoifolin | | OH | | ONeoHesp | | | | OH | |
| diosmin | | OH | | ORut | | | OH | $OCH_3$ | |
| Apiin | | | | OApioGlc | | | | OH | |
| apigenin | OH | OH | | OH | | | | OH | |
| myricetin | OH | OH | | OH | | | OH | OH | OH |
| kaempferol | OH | OH | | OH | | | | OH | |
| luteolin | | OH | | OH | | | OH | OH | |
| morin | OH | OH | | OH | | OH | | OH | |
| neodiosmin | | OH | | ONeoHesp | | | OH | $OCH_3$ | |
| quercitin | OH | OH | | OH | | | OH | OH | |
| rutin | ORut | OH | | OH | | | OH | OH | |
| balcalcin | | OH | OH | OH | | | | | |
| cupressuflavone | | OH | | OH | dimer | | | OH | |
| datiscetin | OH | OH | | OH | | OH | | | |
| diosmetin | | OH | | OH | | | OH | $OCH_3$ | |
| fisetin | OH | | | OH | | | OH | OH | |
| galangin | OH | OH | | OH | | | | | |
| gossypetin | OH | OH | | OH | OH | | OH | OH | |
| geraldol | OH | | | OH | | | OH | $OCH_3$ | |
| hinokiflavone | | OH | OGlc | OH | | | OH | OH | |
| scutellarein | | OH | OH | OH | | | | OH | |
| flavonol | OH | | | | | | | | |
| primuletin | | OH | | | | | | | |
| pratol | | | | OH | | | | | |
| robinetin | OH | | | OH | | | OH | OH | OH |
| quercetagetin | OH | OH | OH | OH | | | OH | OH | |
| $(OH)_4$flavone | | | | OH | OH | | OH | OH | |
| tangeritin | | $OCH_3$ | $OCH_3$ | $OCH_3$ | $OCH_3$ | | | $OCH_3$ | |
| sinensetin | | $OCH_3$ | $OCH_3$ | $OCH_3$ | | | $OCH_3$ | $OCH_3$ | |
| fortunelin | | OH | | OH | | | | $OCH_3$ | |
| kampferide | OH | OH | | OH | | | | $OCH_3$ | |
| chrysoeriol | | OH | | OH | | | $OCH_3$ | OH | |
| isorhamnetin | OH | OH | | OH | | | OH | $OCH_3$ | |
| vitexin | | OH | | OH | Glc | | | OH | |

Notes:

Rut = rutinose;

NeoHesp = neohesperidose;

ApioGlc = apiose-glucose;

Glc = glucose blank box = H

Chromones such as chromone are suitable for use in the present invention. It is clear that substitution on the generic chromone structure, so long as both unsaturation near and oxidation at a carbon atom as in structure (c) of the generic $C_6$-$C_3$ phenylpropenoic carbonyl structures remain, is intended. In fact, substitution is necessary to obtain a wide range of suitable monatin stabilizers. Suitable substituents for the generic structure include, without limitation, OH, OCH$_3$, OGlc, and the like.

Isoflavones suitable for use in the present invention include, without limitation, daidzin, daidzein, biochamin A, prunetin, genistin, glycitein, glycitin, genistein, 6,7,4'-tri(OH)isoflavone, 7,3',4'-tri(OH)isoflavone and combinations thereof. It is clear that substitution on the generic isoflavone structure, so long as both unsaturation near and oxidation at a carbon atom as in structure (b) of the generic $C_6$-$C_3$ phenylpropenoic carbonyl structures remain, is intended. In fact, substitution is necessary to obtain a wide range of suitable monatin stabilizers. Suitable substituents for the generic isoflavone structure include, without limitation, OH, OCH$_3$ and OGlc. Table 6 below sets forth the substituents present for the above-listed isoflavone compounds suitable for use in the present invention.

TABLE 6

Exemplary isoflavone with substituent positions.

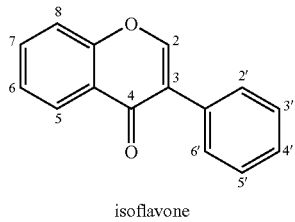

isoflavone

| name | 5 | 6 | 7 | 3' | 4' |
|---|---|---|---|---|---|
| daidzin | | | OGlc | | OH |
| daidzein | | | OH | | OCH$_3$ |
| biochamin A | OH | | OH | | OH |
| prunetin | OH | | OCH$_3$ | | OH |
| genistin | OH | | OGlc | OCH$_3$ | OH |
| glycitein | | OCH$_3$ | OH | OH | OH |
| glycitin | | OCH$_3$ | OGlc | | OH |
| genistein | OH | | OH | | OH |
| 6,7,4'-tri(OH)isoflavone | | OH | OH | | OH |
| 7,3',4'-tri(OH)isoflavone | | | OH | OH | OH |

Notes:
Glc = glucose
blank box = H

In certain preferred embodiments of the present invention, the above-noted $C_6$-$C_3$ phenylpropenoic carbonyl compounds having any of generic cinnamoyl ester, coumarin, chalcone, flavone, chromone, or isoflavone structures can be supplied via an extract of a botanical. Extracts suitable for use in the present invention include, without limitation, horse chestnut, dandelion, eucalyptus, red stringybark, saw palmetto, honeysuckle, hawthorn, noni fruit, red clover, orange, grapefruit, citrumelo, attani, pummelo, sour, orange, lemelo, Natsudaidai orange, buckwheat, chamomile and combinations thereof. As can be seen in Table 7 below, each of the above-noted extracts contains one or more $C_6$-$C_3$ phenylpropenoic carbonyl compounds which serve as a botanically derived monatin stabilizer.

TABLE 7

| common name | species | $C_6$-$C_3$ phenylpropenoic carbonyl compound(s) |
|---|---|---|
| horse chestnut | Aesculus hippocastanum | rutin, esculetin |
| dandelion | Taraxacum | esculetin |
| eucalyptus | Encalyptus oblique | rutin, esculetin |
| red stringybark | E. macrohyncha | rutin, esculetin |
| saw palmetto (sabal or shrub palmetto) | Serenoa repens in Family Arecaceae | isoquercitrin, kaempferol-3-O-glucosides, rhoifolin |
| honeysuckle | Lonicera japonica | luteolin, quercetin, astragalin, isoquercitrin, diosmetin 7-O-glucoside, rhoifolin, lonicerin |
| hawthorn | Crataegus specie | vitexin |
| noni fruit | Morinda citrifolia | morin, rutin |
| red clover | Trifolium presense | isoflavones |
| orange | Citrus sinensis | rutin, flavones, chalcones, coumarins |
| grapefruit | | rhoifolin, isorhoifolin |
| citrumelo | P. trifoliate x C. paradise | rutin, isorhoifolin, rhoifolin |
| attani, pummelo, sour, orange, lemelo, Natsudaidai orange | | rhoifolin |
| buckwheat | Fagopyrum specie | rutin |
| chamomile | Anthemis specie | apigenin-7-glucoside |

As noted above with regard to the botanicals of Table 7, one of ordinary skill in the art will readily appreciate that the amount of a $C_6$-$C_3$ phenylpropenoic carbonyl compound present in a given extract will vary. Different species by nature may possess varying amounts of a $C_6$-$C_3$ phenylpropenoic carbonyl compound. The amount may also vary depending on the stage of development of a given botanical or the portion of the botanical from which the extraction is performed. For example, for many of the citrus fruits, higher concentrations of flavones and flavonols occur in the leaves than in the flavedo, albedo and juice vesicles.

Typically, any of the above-noted monatin stabilizers (generic $C_6$-$C_3$ phenylpropenoic carbonyl structures and cinnamoyl ester, coumarin, chalcone, flavone, chromone, or isoflavone structures) is present in a monatin-containing composition of the present invention in an amount sufficient to provide an amount of stabilizer in a beverage ranging from about 10 ppm to about 500 ppm, preferably from about 50 ppm to about 300 ppm, and more preferably from about 100 ppm to about 200 ppm. When the monatin stabilizer is supplied via an extract of a botanical, the extract is present in a monatin-containing composition of the present invention in an amount sufficient to provide an amount of stabilizer in a beverage in the same amounts noted above. It is important to note that extracts may have varying amounts of stabilizer contained therein. For example, an extract may contain 5% active ingredient or stabilizer; accordingly, the use of 500 ppm of the extract would result in the use of 25 ppm of the stabilizer.

A second aspect of the present invention is directed to a method of preventing monatin degradation in a monatin-containing beverage comprising adding to said beverage a monatin stabilizing amount of a monatin stabilizer.

Beverages include, without limitation, carbonated soft drinks, fountain beverages, frozen ready-to-drink beverages, coffee beverages, tea beverages, powdered soft drinks, as well as liquid concentrates, flavored waters, vitamin-enhanced waters, fruit juice and fruit juice flavored drinks, sport drinks, dairy products and alcoholic products. The beverage may be carbonated or noncarbonated. The beverage may be hot-filled.

The monatin-containing beverage may be fortified by virtue of the presence of one or more of the above-noted vitamins. Additionally, the monatin stabilizer is also the same as described above with respect to the first aspect of the present invention. The monatin-containing composition may be included at any stage of beverage manufacture, i.e., syrup, concentrate, finished beverage.

As noted above, a "monatin stabilizing amount" refers to an amount sufficient to substantially lessen or prevent the degradation of monatin in a monatin-containing beverage. Typically, a monatin stabilizer is added to a monatin-containing beverage in an amount ranging from about 10 ppm to about 500 ppm, preferably from about 50 ppm to about 300 ppm, and more preferably from about 100 ppm to about 200 ppm. When the monatin stabilizer is supplied via an extract of a botanical, the extract is present in a monatin-containing food composition of the present invention in an amount sufficient to provide an amount of stabilizer in a beverage in the same amounts noted above.

Optionally, the method of preventing degradation of monatin in a monatin-containing beverage according to the present invention further comprises adding to said beverage a non-aryl enoic carbonyl compound selected from sorbic acid, aconitic acid, abscisic acid, fumaric acid, maleic acid, or any combination thereof. When present, a non-aryl enoic carbonyl compound is typically added to a beverage in an amount ranging from about 10 ppm to about 200 ppm, and preferably from about 25 ppm to about 100 ppm.

A third aspect of the present invention is directed to a stable monatin-containing beverage comprising monatin and a monatin stabilizing amount of a monatin stabilizer. The stable monatin-containing beverage of the third aspect of the present invention may optionally contain a non-aryl enoic carbonyl compound selected from sorbic acid, aconitic acid, abscisic acid, fumaric acid, maleic acid, or any combination thereof. The amounts of each of the monatin, the monatin stabilizer and the non-aryl enoic carbonyl compound are as described above with respect to the first and second aspects of the invention.

In a fourth aspect, a light-colored beverage is provided comprising a first ingredient represented by any one of the generic $C_6$-$C_3$ phenylpropenoic carbonyl formulas or mixtures thereof, the first ingredient in an effective amount to reduce degradation of a second ingredient, the second ingredient being monatin, and a corresponding change in the beverage color or appearance from first color hue to a second color hue.

In a fifth aspect, a reduced calorie beverage is provided comprising a first ingredient represented by any one of the generic $C_6$-$C_3$ phenylpropenoic carbonyl formulas or mixtures thereof, the first ingredient in an effective amount to reduce degradation of a second ingredient, the second ingredient being monatin, and a corresponding change in a characteristic of the beverage, the characteristic selected from the group consisting of color hue change, sediment, off odor, and lactam formation.

In general, a beverage in accordance with this disclosure can comprise at least water, a first ingredient selected from the group consisting of rutin, isoquercitrin, EMIQ, myricitrin, or a mixture of any of them and a second ingredient comprising monatin. The first ingredient can have a $C_6$-$C_3$ phenylpropenoyl moiety, which can be found in botanical extracts as to a secondary plant metabolite. The first ingredient may be aglycones (no carbohydrate appendages) and some may be glycosides (with carbohydrate appendages) to enhance beverage solubility. The effective amount of the first ingredient to prevent degradation of monatin is limited by the first ingredient's solubility in a beverage, and can range for example from about 1-1000 ppm, and can also range from about 10-200 ppm to reduce degradation of the second ingredient, the second ingredient comprising monatin. The beverage may also comprise flavoring, and typically also acidulant and/or carbonation. Exemplary flavorings which may be suitable for at least certain formulations in accordance with this disclosure include citrus flavoring, cola flavoring, spice flavorings and others. Carbonation in the form of carbon dioxide may be added for effervescence. Preservatives can be added if desired, depending upon the other ingredients, production technique, desired shelf life, etc. Optionally, caffeine can be added. Certain exemplary embodiments of the beverages disclosed here are lemon-lime flavored carbonated beverages, characteristically containing carbonated water, sweetener, lemon/lime flavoring and/or other flavoring, phosphoric acid, and optionally other ingredients, such as coloring. Additional and alternative suitable ingredients will be recognized by those skilled in the art given the benefit of this disclosure.

The beverage products disclosed here include beverages, i.e., ready to drink liquid formulations, beverage concentrates and the like. Beverages include, e.g., carbonated and non-carbonated soft drinks, fountain beverages, frozen ready-to-drink beverages, coffee beverages, tea beverages, dairy beverages, powdered soft drinks, as well as liquid concentrates, flavored waters, enhanced waters, fruit juice and fruit juice-flavored drinks, sport drinks, and alcoholic products. The terms "beverage concentrate" and "syrup" are used interchangeably throughout this disclosure. At least certain exemplary embodiments of the beverage concentrates contemplated are prepared with an initial volume of water to which the additional ingredients are added. Full strength beverage compositions can be formed from the beverage concentrate by adding further volumes of water to the concentrate. Typically, for example, full strength beverages can be prepared from the concentrates by combining approximately 1 part concentrate with between approximately 3 to approximately 7 parts water. In certain exemplary embodiments the full strength beverage is prepared by combining 1 part concentrate with 5 parts water. In certain exemplary embodiments the additional water used to form the full strength beverages is carbonated water. In certain other embodiments, a full strength beverage is directly prepared without the formation of a concentrate and subsequent dilution.

Water is a basic ingredient in the beverages disclosed here, typically being the vehicle or liquid portion in which the remaining ingredients are dissolved, emulsified, suspended or dispersed. Purified water can be used in the manufacture of certain embodiments of the beverages disclosed here, and water of a standard beverage quality can be employed in order not to adversely affect beverage taste, odor, or appearance. The water typically will be clear, colorless, free from objectionable minerals, tastes and odors, free from organic matter, low in alkalinity and of acceptable microbiological quality based on industry and government standards applicable at the time of producing the beverage. In certain typical embodiments, water is present at a level of from about 80% to about 99.9% by weight of the beverage. In at least certain exemplary embodiments the water used in beverages and concentrates disclosed here is "treated water," which refers to water that has been treated to remove substantially all mineral content of the water prior to optional supplementation, e.g., with calcium.

It has been discovered that the use of ascorbic acid in a non-colored carbonated soft drink results in the formation of lactam, a degradation product of monatin, and an undesirable color hue change from no color hue to an undesirable color hue, e.g., pink. As used herein the term "hue" refers to the distinctive characteristics of a given color that enables it to be assigned a position in the spectrum of colors.

In the exemplary embodiments of the beverages disclosed herein, the sweetener monatin is included. In addition to monatin, other sweeteners can be added to the beverages disclosed herein.

Sweeteners suitable for use in various embodiments of the beverages disclosed here include nutritive and non-nutritive, natural and artificial or synthetic sweeteners. Suitable non-nutritive sweeteners and combinations of sweeteners are selected for the desired nutritional characteristics, taste profile for the beverage, mouthfeel and other organoleptic factors. Non-nutritive sweeteners suitable for at least certain exemplary embodiments include, but are not limited to, for example, peptide based sweeteners, e.g., aspartame, neotame, and alitame, and non-peptide based sweeteners, for example, sodium saccharin, calcium saccharin, acesulfame potassium, sodium cyclamate, calcium cyclamate, neohesperidin dihydrochalcone, and sucralose. In certain embodiments the sweetener comprises acesulfame potassium. Other non-nutritive sweeteners suitable for at least certain exemplary embodiments include, for example, sorbitol, mannitol, xylitol, glycyrrhizin, D-tagatose, erythritol, meso-erythritol, malitol, maltose, lactose, fructo-oligosaccharides, Lo Han Guo powder, steviol glycosides, e.g., rebaudiosides such as Rebaudioside A, stevioside, etc. acesulfame, aspartame, other dipeptides, cyclamate, sucralose, saccharin, xylose, arabinose, isomalt, lactitol, maltitol, trehalose, and ribose, and protein sweeteners such as thaumatin, monellin, brazzein, L-alanine and glycine, related compounds, and mixtures of any of them. Lo Han Guo, steviol glycosides, e.g., rebaudiosides such as Rebaudioside A, stevioside, etc. and related compounds are natural non-nutritive potent sweeteners.

In at least certain exemplary embodiments of the beverages disclosed here, the sweetener component can include nutritive, natural crystalline or liquid sweeteners such as sucrose, liquid sucrose, fructose, liquid fructose, glucose, liquid glucose, glucose-fructose syrup from natural sources such as apple, chicory, honey, etc., e.g., high fructose corn syrup, invert sugar, maple syrup, maple sugar, honey, brown sugar molasses, e.g., cane molasses, such as first molasses, second molasses, blackstrap molasses, and sugar beet molasses, sorghum syrup, Lo Han Guo juice concentrate and/or others. Such sweeteners are present in at least certain exemplary embodiments in an amount of from about 0.1% to about 20% by weight of the beverage, such as from about 6% to about 16% by weight, depending upon the desired level of sweetness for the beverage. To achieve desired beverage uniformity, texture and taste, in certain exemplary embodiments of the natural beverage products disclosed here, standardized liquid sugars as are commonly employed in the beverage industry can be used. Typically such standardized sweeteners are free of traces of nonsugar solids which could adversely affect the flavor, color or consistency of the beverage.

Non-nutritive, high potency sweeteners typically are employed at a level of milligrams per fluid ounce of beverage, according to their sweetening power, any applicable regulatory provisions of the country where the beverage is to be marketed, the desired level of sweetness of the beverage, etc. It will be within the ability of those skilled in the art, given the benefit of this disclosure, to select suitable additional or alternative sweeteners for use in various embodiments of the beverage products disclosed here.

Degrees Brix (symbol ° Bx) is a measurement of the mass ratio of dissolved sucrose to water in a liquid. It is measured with a saccharimeter that measures specific gravity of a liquid or more easily with a refractometer. A 25° Bx solution has 25 grams of sucrose sugar per 100 grams of liquid. Or, to put it another way, there are 25 grams of sucrose sugar and 75 grams of water in the 100 grams of solution.

As used herein, "taste" refers to a combination of sweetness perception, temporal effects of sweetness perception, i.e., on-set and duration, off-tastes, e.g. bitterness and metallic taste, residual perception (aftertaste) and tactile perception, e.g. body and thickness. As used herein, a "full-calorie" beverage formulation is one fully sweetened with a nutritive sweetener. The term "nutritive sweetener" refers generally to sweeteners which provide significant caloric content in typical usage amounts, e.g., more than about 5 calories per 8 oz. serving of beverage. As used herein, a "potent sweetener" means a sweetener which is at least twice as sweet as sugar, that is, a sweetener which on a weight basis requires no more than half the weight of sugar to achieve an equivalent sweetness. For example, a potent sweetener may require less than one-half the weight of sugar to achieve an equivalent sweetness in a beverage sweetened to a level of 10 degrees Brix with sugar.

As used herein, "reduced calorie beverage" means a beverage having at least a 25% reduction in calories per 8 oz. serving of beverage as compared to the full calorie version, typically a previously commercialized full-calorie version. As used herein, a "low-calorie beverage" has fewer than 40 calories per 8 oz. serving of beverage. As used herein, "zero-calorie" or "diet" means having less than 5 calories per serving, e.g., per 8 oz. for beverages.

The beverage concentrates and beverages disclosed here may contain additional ingredients, including, generally, any of those typically found in beverage formulations. These additional ingredients, for example, can typically be added to a stabilized beverage concentrate. Examples of such additional ingredients include, but are not limited to, caffeine, caramel and other coloring agents or dyes, antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), $B_1$ (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices. Exemplary amounts are between about 1% and about 100% RDV, where such RDV are established. In certain exemplary embodiments the non-mineral nutritional supplement ingredient(s) are present in an amount of from about 5% to about 20% RDV, where established.

Preservatives may be used in at least certain embodiments of the beverages disclosed here. That is, at least certain exemplary embodiments contain an optional dissolved preservative system. Solutions with a pH below 4 and especially those below 3 typically are "microstable," i.e., they resist growth of microorganisms, and so are suitable for longer term storage prior to consumption without the need for further preservatives. However, an additional preservative system can be used if desired. If a preservative system is used, it can be added to the beverage product at any suitable time during production, e.g., in some cases prior to the addition of the sweetener. As used here, the terms "preservation system" or "preservatives" include all suitable preservatives approved for use in food and beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives can be used in amounts not exceeding mandated maximum levels under applicable laws and regulations. The level of preservative used typically is adjusted according to the planned final product pH, as well as an evaluation of the microbiological spoilage potential of the particular beverage formulation. The maximum level employed typically is about 0.05% by weight of the beverage. It will be within the ability of those skilled in the art, given the benefit of this disclosure, to select a suitable preservative or combination of preservatives for beverages according to this disclosure.

It is believed that EMIQ, precursors of EMIQ, and myricitrin each reduces degradation of monatin as measured by monatin recovered from the beverage matrix after stress testing as well as reduced lactone/lactam formation measured after stress testing (see Tables 8-10). EMIQ, precursors of EMIQ, and myricitrin each inhibits the formation of color hue change in beverages containing monatin. For example, EMIQ, precursors of EMIQ, and myricitrin each inhibits the formation of a color change in a beverage containing monatin. For example, EMIQ, precursors of EMIQ, and myricitrin each inhibits the formation of a color change in a non-colored beverage from no color to a pink color. The antioxidant EMIQ, precursors of EMIQ, and myricitrin each eliminates undesirable color hue development in the absence of ascorbic acid. Myricitrin has been reported as having an antioxidant action, see e.g., Flavia Carla Meotti, et al., "Analysis of the antinociceptive effect of the flavonoid myricitrin," JPET #92825, American. Society. for Pharm. and Experimental Therapeutics (2005), published as DOI:10.1124/jpet.105.092825. The use of EMIQ, a precursor of EMIQ, and/or myricitrin is particularly useful in inhibiting the formation of an undesirable color (e.g., pink) in non-colored beverages, such as lemon/lime flavored beverages. The use of EMIQ, a precursor of EMIQ, and/or myricitrin can be particularly useful in inhibiting the formation of an undesirable color hue in light-colored beverages, such as teas, and sports drinks and near waters. In at least certain conditions, myricitrin has been found to work better than EMIQ in reducing degradation of monatin and inhibiting the formation of pink color as monatin degrades. In Example 2, Table 10, one observes dose-response effects. Consider 100 uL of SanMelin Y-AF with 3% myricitrin delivers 3 mg in 300 mL of beverage equaling 30 ppm of flavonoid. Whereas, 200 uL of SanMelin AO-3000 with 15% EMIQ delivers 30 mg in 300 mL of beverage equaling 100 ppm of flavonoid. The stress testing data at those doses indicate better UV protection when myricitrin is used than when EMIQ is used.

It has been discovered that EMIQ, ascorbic acid or myricitrin protects against pink coloration and off-flavor development during 24 h of UV exposure.

EMIQ is an antioxidant commercially available from at least San-Ei Gen F.F.I. (Japan). See U.S. Pat. No. 6,572,906. EMIQ is generally regarded as an antioxidant that prevents colors from fading. EMIQ is derived from isoquercitrin, which in turn is derived from rutin. The useful application of EMIQ as described herein can be extrapolated to precursors of EMIQ, including rutin and isoquercitrin. For example, U.S. Ser. No. 11/267,376, incorporated herein by reference in its entirety, discloses a $C_6$-$C_3$ phenylpropenoyl moiety that can be extrapolated to nearly every botanical secondary plant metabolite. The subtle distinctions between EMIQ, rutin and others is merely carbohydrate appendages that enhance beverage solubility. They all retain the necessary $C_6$-$C_3$ moiety.

Myricitrin has been reported as having an antioxidant action, see e.g., Flavia Carla Meotti, et al., "Analysis of the antinociceptive effect of the flavonoid myricitrin," JPET #92825, see above. Chinese bayberry extract contains the flavonoid, i.e. myricitrin, obtained by extraction from the fruit, bark or leaves of *Myrica rubra* SIEBOLD using water, ethanol, methanol or the like. See U.S. Patent Application Publication US 2006/0051472 A1, at paragraph [075].

It has thus been discovered that EMIQ and/or myricitrin can be used in any ready to drink beverage, including but not limited to beverages utilizing ascorbic acid in part or in whole at low pH, wherein the EMIQ and/or myricitrin acts to prevent or reduce degradation of monatin and a corresponding change in color hue in the beverage, and prevent or reduce lactam formation, sediment formation, and off odor.

EXAMPLES

The following illustrates specific embodiments of the present invention (i.e., embodiments using EMIQ) but are not intended to limit it. All percentages are by weight unless otherwise stated. Heat treatment of bottled beverage was conducted in a thermostatically controlled oven. UV exposure of bottled beverage was conducted within an Atlas CI 5000 with Xenon arc lamp in a thermostatically controlled oven.

Example 1

TABLE 8

| Lemon/Lime Carbonated Soft Drink (265 ppm sodium benzoate, 333 ppm ascorbic acid (where indicated), 30 ppm CaNa2EDTA, 50 ppm monatin) | Color Hue Change, 1 week @ 110° F. | Color Hue Change, UV 24 hours @ 86° F. |
|---|---|---|
| ascorbic acid | No | No |
| ascorbic acid + 7.5 ppm EMIQ | No | No |
| no ascorbic acid | No | Yes* |
| no ascorbic acid + 7.5 ppm EMIQ | No | No |

*pink to rust color develops

Additional analyses of the lemon/lime ("L/L") flavored beverages above were conducted to determine formation of lactone (reversible) or lactam (irreversible) from monatin. The accumulation of the two degradation products would reduce sweetness impact over time and reduce consumer acceptance of a product containing a beverage comprising monatin. It has now been discovered that EMIQ, and not ascorbic acid, reduces or eliminates formation of lactam from monatin in a low pH matrix during heat stress conditions. Table 9 shows additional test results in cola and lemon/lime (L/L) beverages, each having 50 ppm monatin as a sweetener. The amounts of ascorbic acid (where indicated) was 333 ppm, and the amount of EMIQ (where indicated) was 7.50 ppm (50 uL of 15% EMIQ as San-Melin AO-3000=7.5 ppm). Heat treatment of bottled beverage was conducted in a thermostatically controlled oven for one week at 110° F. UV exposure of bottled beverage was conducted within an Atlas CI 5000 with Xenon arc lamp in a thermostatically controlled oven for 24 hours at 86° F.

It is noted that less lactone and lactam protection in heat and light is evident in cola. This is perhaps due to the overwhelming photosensitization that caramel in cola presents. Extrapolation of experiments with considerably higher levels of $C_6$-$C_3$ phenylpropenoyl moieties would enhance the needed protection for cola in heat and light. More clear cut protection in heat and light is evident in lemon/lime beverages where $C_6$-$C_3$ phenylpropenoyl moieties reduce lactam formation to a non-detectable level thereby preserving the monatin content and therefore desired sweetness intensity at the original 50 ppm level.

TABLE 9

|      |    |                          | Cola            |               | L/L*            |               |
|------|----|--------------------------|-----------------|---------------|-----------------|---------------|
|      |    |                          | Lactone (ppm)   | Lactam (ppm)  | Lactone (ppm)   | Lactam (ppm)  |
| Heat | A1 | Ascorbic acid            | 9               | 7.2           | 8.3             | 4.9           |
|      | B1 | Ascorbic acid and EMIQ   | 9.1             | 7.2           | 7.8             | n.d.*         |
|      | C1 | No ascorbic acid         | 8.6             | 6.9           | 8.1             | 4.8           |
|      | D1 | No ascorbic acid with EMIQ | 8.8           | 7.1           | 8               | n.d.          |
| UV   | A2 | Ascorbic acid            | 9.1             | 2             | 9               | 0.7           |
|      | B2 | Ascorbic acid and EMIQ   | 9               | 2             | 8.5             | n.d           |
|      | C2 | No ascorbic acid         | 7.3             | 1.6           | 2.7             | 0.6           |
|      | D2 | No ascorbic acid with EMIQ | 8.2           | 1.9           | 8.8             | n.d.          |

*n.d. means not detectable.

The following illustrates specific embodiments of the present invention (i.e., embodiments using myricitrin) but are not intended to limit it. In side by side comparison testing, myricitrin performed better by weight basis than EMIQ in providing better monatin protection. SanMelin Y-AF is Chinese Bayberry extract at a 3% dilution of myricitrin. SanMelin AO-3000 is EMIQ at a 15% dilution.

UV exposure of bottled beverage was conducted within an Atlas CI 5000 with Xenon arc lamp in a thermostatically controlled oven. Table 9 illustrates the protection of L/L beverages from lactam formation in light stress. Further experimentation afforded the data in Table 10 to show protection of L/L beverages from loss of monatin and formation of the reversible lactone. More importantly, higher levels of each protectant in Table 10 versus Table 9 reduced lactam formation in colas.

Example 2

TABLE 10

|                      | L/L CSD (24 h UV exposure) Monatin + lactone | Cola CSD (24 h UV exposure) Lactam formation |
|----------------------|-----------------------------------------------|------------------------------------------------|
| No ascorbic acid     | 11.3 ppm                                      | 3.5 ppm                                        |
| 30 ppm myricitrin    | 29.3 ppm                                      | 2.9 ppm                                        |
| 100 ppm EMIQ         | 39 ppm                                        | 1.8 ppm                                        |
| 300 ppm ascorbic acid| 37.7 ppm                                      | 2.9 ppm                                        |

(CSD = carbonated soft drink)

As noted above, the accumulation of lactam (irreversible) from monatin, would reduce sweetness impact over time and reduce consumer acceptance of a product containing a beverage comprising monatin.

The above results can be extrapolated from the beverages identified in Tables 8, 9, and 10, to other beverages that contain monatin. The results in the Tables for a non-colored carbonated soft drink lemon/lime flavored beverage can be extrapolated to other beverages, including but not limited to light colored beverages, teas, colas, sports drinks, and near waters that comprise monatin. "Other" beverages than a carbonated soft drink generally include similar ingredients such as preservatives, acidulants, buffers, metal sequestrants, flavors, and of course a selected sweetener. The only major difference is the presence of the inert gas, carbon dioxide, which is dissolved as the mild acidulant carbonic acid.

Thus, in accordance with another aspect of the invention, a colored beverage is provided comprising a stabilizer selected from the group consisting of rutin, isoquercitrin, enzymatically modified isoquercitrin (EMIQ), myricitrin, or a mixture of any of them, in an effective amount to reduce degradation of monatin and a corresponding color change in the beverage from desired color to an undesirable color. The colored beverage can be any kind of a colored beverage, such as tea, cola, sports drink, or near water.

Each of the above beverages comprising monatin, and EMIQ or myricitrin can be formed by mixing a corresponding concentrate with water in a suitable amount and manner.

Each of the above beverages comprising monatin, and EMIQ or myricitrin (unless indicated otherwise above) is found to have good taste, mouthfeel and desired color hue or no color hue, and low sediment, low off odor, and low lactam formation. The following Table 11 summarizes these characteristics. Color hue, sediment and odor were observed qualitatively as a visual test while the lactam characteristic was measured analytically (cf. Table 9, 10).

TABLE 11

| Characteristic              | Without Stabilizer (i.e., without EMIQ or myricitrin) | With Stabilizer (i,e., with EMIQ or myricitrin) |
|-----------------------------|---------------------------------------------------------|--------------------------------------------------|
| Undesirable Color Hue Change | Present                                                | Absent                                           |
| Undesirable Sediment        | Present                                                 | Absent                                           |
| Undesirable Off Odor        | Present                                                 | Absent                                           |
| Undesirable Lactam          | Present                                                 | Minimized                                        |

Given the benefit of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. A monatin-containing beverage comprising monatin and a monatin stabilizer comprising a $C_6$-$C_3$ phenylpropenoic carbonyl structure represented by a formula selected from the group consisting of

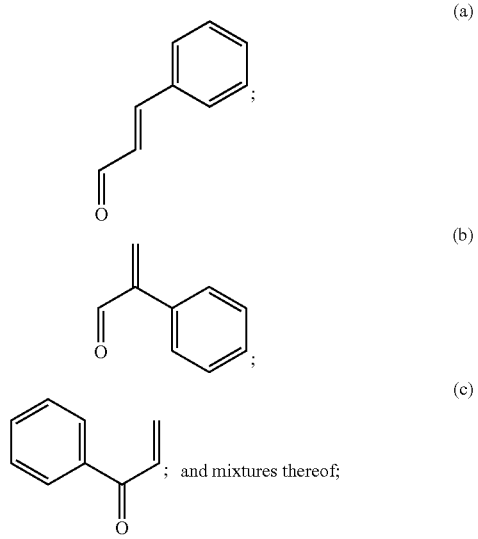

and mixtures thereof;

the monatin stabilizer selected from the group consisting of isoquercitrin, enzymatically modified isoquercitrin (EMIQ), myricitrin, or a mixture of any of them in an effective amount in the monatin-containing beverage in the range of about 7.5 ppm to about 1000 ppm to reduce degradation of monatin in the monatin-containing beverage and a corresponding change in a characteristic of the monatin-containing beverage as compared to the same monatin-containing beverage without the monatin stabilizer, the corresponding change in the characteristic of the monatin-containing beverage comprising formation of lactam.

2. A monatin-containing beverage in accordance with claim 1, the monatin stabilizer present in an effective amount in the monatin-containing beverage in the range of about 10 ppm to about 200 ppm.

3. A monatin-containing beverage in accordance with claim 1, wherein the monatin stabilizer comprises myricitrin in an effective amount in the monatin-containing beverage in the range of about 10 ppm to about 200 ppm.

4. A monatin-containing beverage in accordance with claim 1, wherein the monatin stabilizer comprises enzymatically modified isoquercitrin (EMIQ) in an effective amount in the monatin-containing beverage in the range of about 10 ppm to about 200 ppm.

5. A monatin-containing beverage in accordance with claim 1, wherein the corresponding change in the characteristic of the monatin-containing beverage further comprises a color hue change.

6. A monatin-containing beverage in accordance with claim 1, wherein the corresponding change in the characteristic of the monatin-containing beverage further comprises formation of sediment.

7. A monatin-containing beverage in accordance with claim 1, wherein the corresponding change in the characteristic of the monatin-containing beverage further comprises off odor.

8. A monatin-containing beverage in accordance with claim 1, wherein the monatin stabilizer comprises EMIQ.

9. A monatin-containing beverage in accordance with claim 1, wherein the monatin stabilizer comprises myricitrin.

10. A monatin-containing beverage in accordance with claim 1, wherein the monatin-containing beverage is a carbonated or non-carbonated lemon/lime flavored beverage.

11. A monatin-containing beverage in accordance with claim 1, wherein the monatin-containing beverage is a colored beverage, the monatin stabilizer in an effective amount to reduce degradation of monatin in the monatin-containing beverage and a corresponding color hue change in the monatin-containing beverage from a first color hue to a second color hue.

12. A monatin-containing beverage in accordance with claim 11, wherein the monatin-containing beverage is a light colored monatin-containing beverage.

13. A monatin-containing beverage in accordance with claim 1 wherein the monatin-containing beverage is selected from the group consisting of a carbonated beverage, a tea, a sports drink, and a near water.

14. A monatin-containing beverage in accordance with claim 1 wherein the beverage is a reduced calorie beverage.

15. A monatin-containing non-colored beverage comprising a monatin stabilizer comprising a $C_6$-$C_3$ phenylpropenoic carbonyl structure represented by a formula selected from the group consisting of

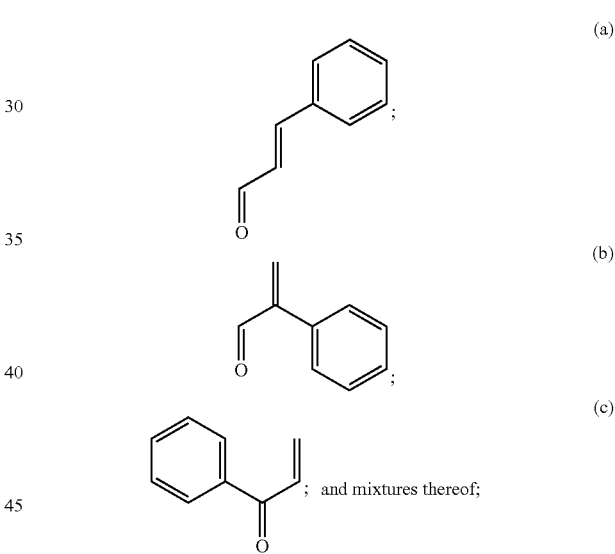

and mixtures thereof;

the monatin stabilizer selected from the group consisting of rutin, isoquercitrin, enzymatically modified isoquercitrin (EMIQ), myricitrin, or a mixture of any of them in an effective amount in the monatin-containing non-colored beverage in the range of about 7.5 ppm to about 1000 ppm to reduce degradation of monatin in the monatin-containing non-colored beverage and a corresponding color hue change in the monatin-containing non-colored beverage from no color hue to a color hue as compared to the same monatin-containing non-colored beverage without the monatin stabilizer, the corresponding color hue change corresponding to formation of lactam.

16. A monatin-containing non-colored beverage in accordance with claim 15, the monatin stabilizer present in an effective amount in the monatin-containing non-colored beverage in the range of about 7.5 ppm to about 200 ppm.

17. A monatin-containing non-colored beverage in accordance with claim 16 wherein the monatin stabilizer comprises EMIQ.

18. A monatin-containing non-colored beverage in accordance with claim 16 wherein the monatin stabilizer comprises myricitrin or a composition comprising myricitrin.

19. A monatin-containing non-colored beverage in accordance with claim 15, wherein the monatin-containing beverage is a carbonated or non-carbonated lemon/lime flavored beverage.

20. A method of preventing degradation of monatin in a monatin-containing beverage comprising:

adding at least one monatin stabilizer wherein the monatin stabilizer comprises a $C_6$-$C_3$ phenylpropenoic carbonyl structure represented by a formula selected from the group consisting of

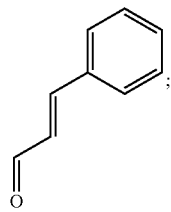

(a)

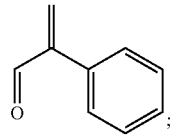

(b)

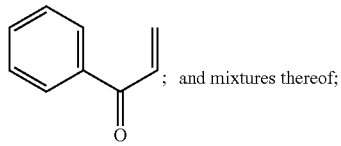

(c)

; and mixtures thereof;

the at least one monatin stabilizer selected from the group consisting of rutin, isoquercitrin, enzymatically modified isoquercitrin (EMIQ), myricitrin, or a mixture of any of them in an effective amount in the monatin-containing beverage in the range of about 7.5 ppm to about 1000 ppm to reduce degradation of monatin in the monatin-containing beverage and a corresponding change in a characteristic of the monatin-containing beverage as compared to the same monatin-containing beverage without the at least one monatin stabilizer, the corresponding change in the characteristic of the monatin-containing beverage comprising formation of lactam.

* * * * *